United States Patent
Meloche (10) Patent No.: US 8,072,890 B2
(45) Date of Patent: Dec. 6, 2011

(54) SYSTEM AND METHOD FOR TESTING A DYNAMIC COMMUNICATION ACROSS A NETWORK

(75) Inventor: Jean Meloche, Madison, NJ (US)

(73) Assignee: Avaya Inc., Basking Ridge, NJ (US)

( * ) Notice: Subject to any disclaimer, the term of this patent is extended or adjusted under 35 U.S.C. 154(b) by 257 days.

(21) Appl. No.: 12/434,265

(22) Filed: May 1, 2009

(65) Prior Publication Data

US 2010/0278049 A1 Nov. 4, 2010

(51) Int. Cl.
G01R 31/08 (2006.01)
(52) U.S. Cl. .......................... 370/242; 370/389; 709/224
(58) Field of Classification Search .................. 370/352, 370/389, 390; 709/224
See application file for complete search history.

(56) References Cited

U.S. PATENT DOCUMENTS

| | | | |
|---|---|---|---|
| 6,243,454 B1 | 6/2001 | Eslambolchi | |
| 6,411,923 B1 | 6/2002 | Stewart et al. | |
| 6,542,504 B1 | 4/2003 | Mahler et al. | |
| 6,760,345 B1 | 7/2004 | Rosengard | |
| 6,775,240 B1 | 8/2004 | Zhang et al. | |
| 7,136,359 B1 | 11/2006 | Coile et al. | |
| 7,173,910 B2 | 2/2007 | Goodman | |
| 7,203,173 B2 | 4/2007 | Bonney et al. | |
| 7,340,529 B1 | 3/2008 | Yazaki et al. | |
| 7,899,048 B1 * | 3/2011 | Walker et al. ................. | 370/390 |
| 2001/0050903 A1 | 12/2001 | Vanlint | |
| 2002/0012388 A1 | 1/2002 | Eldumiati et al. | |
| 2002/0021680 A1 | 2/2002 | Chen | |
| 2002/0057690 A1 | 5/2002 | Kingsley | |
| 2002/0191614 A1 | 12/2002 | Ido et al. | |
| 2002/0193999 A1 | 12/2002 | Keane et al. | |
| 2003/0028634 A1 * | 2/2003 | Oshizawa ...................... | 709/224 |
| 2003/0086425 A1 * | 5/2003 | Bearden et al. ............... | 370/392 |
| 2003/0165162 A1 | 9/2003 | Westphal | |
| 2004/0052216 A1 | 3/2004 | Roh | |
| 2004/0172464 A1 | 9/2004 | Nag | |

(Continued)

FOREIGN PATENT DOCUMENTS

EP 1763193 A1 3/2007

(Continued)

OTHER PUBLICATIONS

Webpage, Visual Performance Manager for Application Performance Management—Fluke Networks (http://www.flukenetworks.com/fnet/en-us/products/Visual+Performance+Manager/Overview...), Mar. 13, 2009, pp. 1-2.

(Continued)

Primary Examiner — Ayaz Sheikh
Assistant Examiner — Mounir Moutaouakil
(74) Attorney, Agent, or Firm — Sheridan Ross P.C.

(57) ABSTRACT

A network monitor gets a bill of materials for a communication across a network where different communication paths may be established. A bill of materials is a list of hardware/software components that are used to establish and maintain the communication. A request to generate a test communication between the same devices involved in the communication is received. A request to sample and send samples of test data is sent to a network analyzer. The test communication is established. A bill of materials for the test communication is determined. The bill of materials for the communication is compared to the bill of materials for the test communication. Test data is sent on the test communication. The sent test data is analyzed in relation to the sent samples of the test data and the compared bills of materials.

22 Claims, 6 Drawing Sheets

U.S. PATENT DOCUMENTS

| | | | |
|---|---|---|---|
| 2005/0041660 | A1 | 2/2005 | Pennec et al. |
| 2006/0215596 | A1 | 9/2006 | Krishnaswamy et al. |
| 2006/0218447 | A1 | 9/2006 | Garcia et al. |
| 2006/0227714 | A1 | 10/2006 | Griffin et al. |
| 2007/0081471 | A1 | 4/2007 | Talley, Jr. et al. |
| 2007/0086336 | A1 | 4/2007 | Richards et al. |
| 2007/0252695 | A1 | 11/2007 | Bhavani |
| 2007/0286351 | A1 | 12/2007 | Ethier et al. |
| 2008/0313312 | A1* | 12/2008 | Flynn et al. .......... 709/221 |
| 2009/0073906 | A1 | 3/2009 | Yi et al. |
| 2009/0268622 | A1 | 10/2009 | Blum et al. |
| 2010/0027429 | A1 | 2/2010 | Jorgens et al. |

FOREIGN PATENT DOCUMENTS

| | | | |
|---|---|---|---|
| EP | 1228619 | B1 | 2/2008 |
| WO | WO 2006/065863 | A2 | 6/2006 |
| WO | WO 2007/036786 | A2 | 4/2007 |

OTHER PUBLICATIONS

Network Instruments, "VoIP Analysis, Manager, Monitor, and Maintain VoIP Communications Across Enterprise Networks with Observer," 2006, Product Brochure, US, 4 pages.

Meloche, Jean, U.S. Appl. No. 12/533,483, entitled "System and Method for Comparing Packet Traces for Failed and Successful Communications," filed Jul. 31, 2009, 30 pages.

Meloche, Jean, U.S. Appl. No. 12/622,840, entitled "Detection and Display of Packet Changes in a Network," filed Nov. 20, 2009, 27 pages.

Meloche, U.S. Appl. No. 12/410,980, filed Mar. 25, 2009, for "System and Method for Sending Packets Using Another Device's Network Address".

Meloche, U.S. Appl. No. 12/433,630, filed Apr. 30, 2009, for "System and Method for Monitoring a Network Communication at Multiple Network Layers".

Meloche, U.S. Appl. No. 12/436,651, filed May 6, 2009, for "Intelligent Multi-Packet Header Compression".

Denby, U.S. Appl. No. 12/039,878, filed Feb. 29, 2008, for "Endpoint Device Configured to Permit User Reporting of Quality Problems in a Communication Network".

Flockhart, et al., U.S. Appl. No. 12/239,120, filed Sep. 26, 2008, for "Clearing House for Publish/ Subscribe of Status Data From Distributed Telecommunications Systems".

* cited by examiner

SYSTEM AND METHOD FOR TESTING A DYNAMIC COMMUNICATION ACROSS A NETWORK

TECHNICAL FIELD

The system and method relates to network communication monitoring systems and in particular to systems that identify potential faults on communication networks.

BACKGROUND

Currently, there are a variety of systems that are designed to test and identify potential faults in communication networks. With the proliferation and increased complexity of communication networks, it has become difficult to diagnose potential faults (either hardware or software) that may be causing communication errors. When a problem communication is detected, just establishing a second communication between the same devices for testing may not be sufficient to identify a specific cause of the problem. The reason is because the same network path is unlikely to be used in both communications. The two communications may use different links, gateways, ports, software, and the like.

An example of the above problem is illustrated in U.S. Pat. No. 7,173,910. A series of test probes are deployed around the boarder of a Voice Over Internet Protocol (VOIP) network. VOIP calls are placed between the test probes to identify a quality of service between the test probes. This solution suffers from the above problems because each time a VOIP call is made over the VOIP network, a different communication path may be used. Thus, a first VOIP communication that is established between two probes may get very different test results than a second VOIP communication between the same two test probes because the two communications may traverse a different communication path on the VOIP network. This solution may be able to identify that there is a problem in the network, but it cannot diagnose where in the network a problem resides.

Other solutions send test data in conjunction with an existing communication rather than setting up a second communication. For example, U.S. Patent Application Publication No. 2002/0193999 discloses a system that adds test information to an ongoing voice communication. This allows a quality measurement for a specific voice call. However, this solution does not determine what network elements are involved in the voice communication; but instead it is used to determine the quality of service of a particular voice call. Moreover, this solution adds overhead to existing voice communications by increasing the number of packets sent for each communication. Like the prior solutions, this system may be able to diagnose that there may be a quality of service problem between two communication devices, but it cannot diagnose where in the network a problem resides.

SUMMARY

The system and method are directed to solving these and other problems and disadvantages of the prior art. A network monitor gets a bill of materials for a communication across a network where different communication paths may be established. A bill of materials is a list of hardware/software components that are used to establish and maintain the communication. A request to generate a test communication between the same devices involved in the communication is received. A request to sample and send samples of test data is sent to a network analyzer. The test communication is established. A bill of materials for the test communication is determined. The bill of materials for the communication is compared to the bill of materials for the test communication. Test data is sent on the test communication. The sent test data is analyzed in relation to the sent samples of the test data and the compared bills of materials.

In an alternative embodiment, the bill of materials for the communication is the same as the bill of materials for the test communication. In this case, the sent test data is analyzed in relation to the sent samples of the test data. The bills of materials are not compared because they are the same.

BRIEF DESCRIPTION OF THE DRAWING

These and other features and advantages of the system and method will become more apparent from considering the following description of an illustrative embodiment of the system and method together with the drawing, in which.

DETAILED DESCRIPTION

Figure 1:
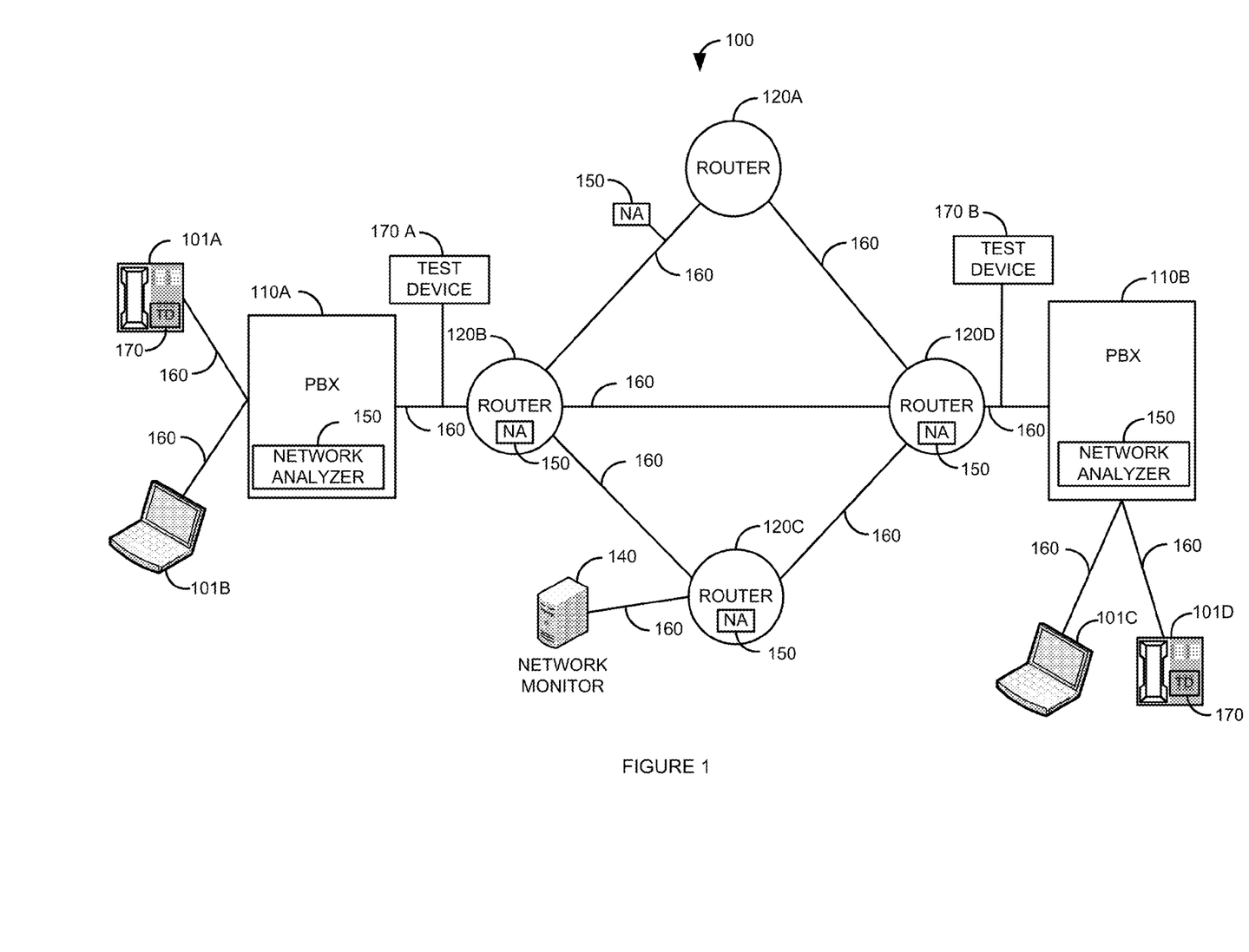
FIG. 1 is a block diagram of a first illustrative example of a typical communication network.

FIG. 1 is a block diagram of a first illustrative example of a typical network 100 of many possible network configurations. The illustrative network 100 may comprise various networks such as the Internet, a private network, the Public Switched Telephone Network (PSTN), and the like. The shown illustrative network 100 comprises communication devices 101, a Private Branch Exchange (PBX) 110, routers 120, a network monitor 140, network analyzers 150, and test devices 170. The communication devices 101 can be any type of device that can communicate information such as a telephone, a cellular telephone, a Personal Digital Assistant (PDA), a Personal Computer (PC), a web server, a video camera, a camera, a video server, and the like. The PBX 110 can be any device capable of routing/switching a communication such as a router 120, a server, a switch, and the like.

The router 120 can be any device capable of routing communications in a network 100, such as a PBX or a central office switch. The routers 120 can route packet communications and/or switch Time Division Multiplexed (TDM) communications. The network monitor 140 can be any device capable of monitoring network communications such as a server, a PBX 110, a PC, a communication device 101, and the like. The network monitor 140 can be distributed between multiple devices, including the communication devices 101. The test device 170 can be any device capable of establishing a communication such as a telephone, a PC, a server, a network analyzer 150, and the like. The test device 170 can be part of a network analyzer 150 or embedded in a communication device (e.g. 101A and 101D). These devices 101 110, 120, 140, 150, and 170 are connected via communication links 160. The communication links 160 can be any type of communication link such as a wireless link, a wired link, a packet switched link, a Time Division Multiplexed (TDM) link, a fiber optic link, and the like.

The PBX 110 may contain a network analyzer 150 to monitor packets that are sent to and from the PBX 110. The routers 120B-120D are shown each with an embedded network analyzer 150. Router 120A is shown with an external network analyzer 150. Likewise, the communication devices 101 may each have an embedded network analyzer 150 or not.

The network analyzers 150 are used to monitor and take samples of one or more communications between one or more communication devices 101. Taking samples can be done in various ways such as analyzing packets, sampling Time Division Multiplexed data, looking at a packet header, looking a packet payload, and the like. The network analyzers 150 are configured using known techniques. For example, the system and method disclosed in U.S. patent application Ser. No. 12/410,980 which is incorporated herein by reference discloses a way that the network analyzers 150 can be configured and monitor the illustrative network 100. The network analyzers 150 could be passive network analyzers or the network analyzers 150 could be bridged network analyzers.

The network monitor 140 gets a bill of materials for a communication between a plurality of communication devices 101. The bill of materials may be based on one or more network layers (i.e. layers of the Open System Interconnect (OSI) model) and/or be based on different types of communication in a signaling layer (e.g. media data and signaling data at layer 7). Further details on how bills of materials for a communication are captured and displayed is disclosed in U.S. patent application Ser. No. 12/433,630, filed Apr. 30, 2009, which is incorporated herein by reference. The bill of materials for the communication is a list of items involved in the communication (e.g. communication devices 101, routers 120, PBX 110, and the like). The bill of materials for the communication contains a plurality of items.

The communication between the plurality of communication devices 101 is established on a network 100 where different communication paths (i.e. a different bill of materials) can be established depending upon one or more conditions in the network 100. For example, based on congestion in the network 100 at router 120A, router 120B may route packets to router 120C and/or 120D where previously all packets were sent to router 120A. Thus, different communications may be routed through different network paths depending on congestion, packet loss, quality of service, hardware failures, and the like. Communication data is sent on the communication between the plurality of communication devices 101.

The network monitor 140 receives a request to generate a first test communication between the plurality of communication devices 101. The request can be sent from a user at the network monitor 140, can be generated and sent by a user of one of the communication devices 101 involved in the communication, can be generated automatically based on predefined conditions (e.g. packet loss, dropped connections), and the like. An example of how this would be used is where a communication is experiencing echo problems. A user could initiate the request to generate the first test communication to diagnose where potential problems lie in the defective communication's path.

The network monitor 140 sends a request to take one or more samples of first test data from one or more items in the bill of materials for the communication to the network analyzer(s) 150 and send the one or more samples to the network monitor 140. The network monitor 140 initiates establishment of the first test communication between the plurality of communication devices 101 which are involved in the communication. This can be done by sending one or more packets (or data if non-packet) to one or more of the communication devices 101 involved in the communication instructing the communication devices 101 to initiate the test communication.

The network monitor 140 gets a bill of materials for the first test communication. The network monitor 140 compares the bill of materials for the communication to the bill of materials for the first test communication. By comparing the two bills of materials, the network monitor 140 can determine which items in the bills of materials are common between the communication and the first test communication.

The network monitor 140 initiates the sending of the first test data in the first test communication. The first test data can vary based on what is to be tested. For example, the network monitor 140 may have a stored sample of voice data to send as first test data for a voice communication. The network monitor 140 may have collected samples of the payload of media packets of the communication that may be used as the first test data. The first test data can be the same data as the communication data. The media packets can be various kinds of packets such as a voice packet and a video packet. An example of this is where a network analyzer 150 samples voice packets for the encoded voice signal via a network analyzer 150. The sampled packets are sent to the network monitor 140 which uses the sampled packet to create the first test data. In another illustrative example, the test data may be video data or application data such as a document. The test data could be signaling packets to set up the first test communication or any combination of the above.

The network monitor 140 receives the one or more sent samples of the first test data from the network analyzer(s) 150. The network monitor 140 analyzes the sent first test data in relation to the received one or more samples of the first test data in relation to the compared bills of materials. This allows the network monitor 140 to diagnose which items (e.g. common items in the bills of materials) may potentially be at fault if there were problems with the communication. For example, if both bills of materials show that router 120A is involved in the communication and the first test communication, and router 120A is experiencing a large number of lost packets due to Cyclic Redundancy Check (CRC) errors (based on network analyzer 150 next to router 120A sampling sent/received packets), then the network monitor 140 can determine that router 120A may have a potential fault. The network monitor 140 can then display the potential fault in router 120A to a user of the network monitor 140 and/or a user of one of the communication devices 101 involved in the communication.

Figure 2:
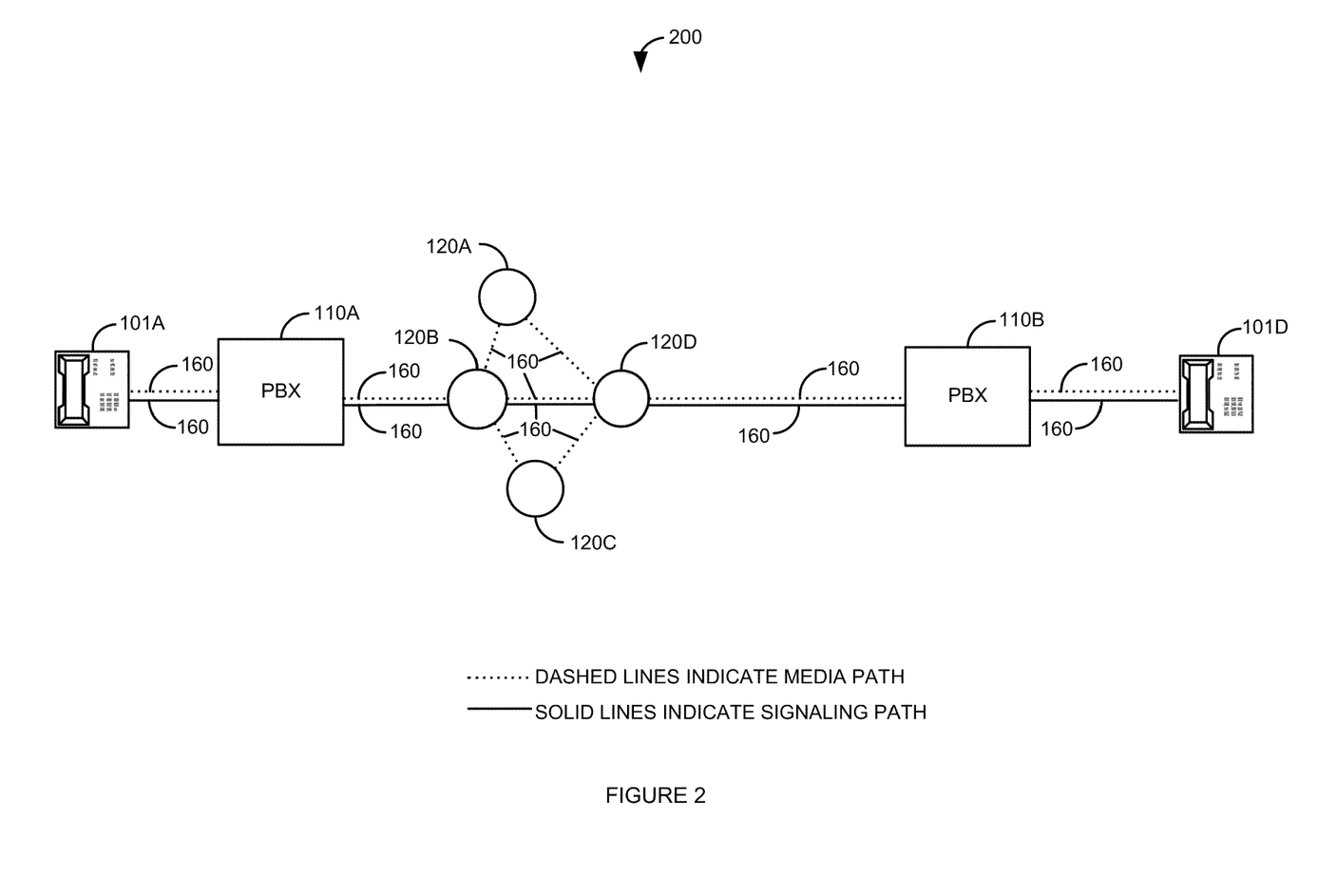
FIG. 2 is a diagram of a bill of materials for a communication across a network.

FIG. 2 is an illustrative diagram of a bill of materials for a communication 200 across network 100. In this illustrative example, all the items (communication devices 101, routers 120, and the like) displayed are devices that process packets at layer 3 and/or layer 7. For example, routers 120A-120D only process packets at layer 3, whereas items 101A 110A, 110B, and 101D process packets at layer 7 and potentially at layer 3. These items can also process packets at other layers such as layer 4 for TCP/UDP transport.

The network monitor 140 displays the layer 3/7 bill of materials for the communication 200 after getting the media path bill of materials and getting the signaling path bill of materials. The media path bill of materials contains items where media packets/data (e.g. voice packets) are processed/sent/received. The signaling path bill of materials contains items where signaling packets/data are processed/sent/received. The items in the layer 3/7 media path bill of materials (101A, 110A 120A-D, 110B, and 101D are shown connected by the dashed lines/communication links 160. The items in the layer 3/7 signaling path bill of materials (101A, 110A, 110B, and 101D are shown connected by the solid lines/communication links 160.

Routers 120B and 120D are shown with a darkened fill to indicate an illustrative way in which items in a bill of materials for the communication may be shown to have a potential fault. Identification of items in a bill of materials for the communication that may have a potential fault can be done in a variety of ways, such as using colors to identify a link 160 that may have a potential fault, changing the color of an item, adding text to an item, and the like.

Figure 3:
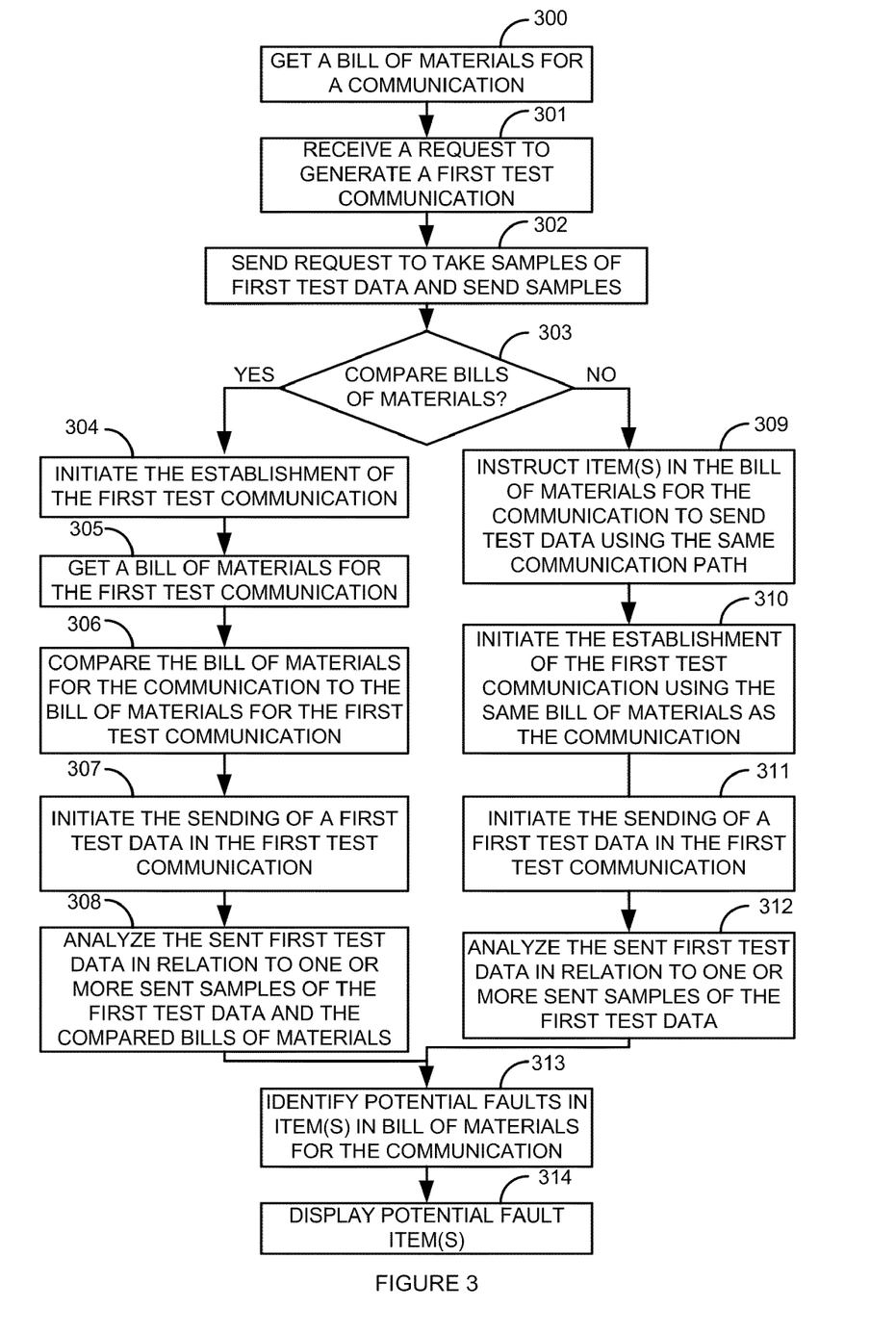
FIG. 3 is a flow diagram of a method for identifying potential faults in items in a bill of materials of a communication by establishing a first test communication.

FIG. 3 is a flow diagram of a method for identifying potential faults in items in a bill of materials for a communication by establishing a first test communication. Illustratively, the communication devices 101, the PBXs 110, the routers 120, the network monitor 140, the network analyzers 150, and the test device 170 are stored-program-controlled entities, such as a computer, which performs the method of FIGS. 3-6 by executing a program stored in a storage medium, such as a memory or disk.

The process begins when the network monitor 140 gets 300 a bill of materials for the communication between a plurality of communication devices 101. The communication could be a simple communication such as a voice communication between two communication devices 101. The communication could also be a voice or video conference between multiple communication devices 101. The communication contains communication data.

The network monitor 140 receives 301 a request to generate a first test communication for the communication between the plurality of communication devices 101. The network monitor 140 sends 302 to the network analyzer(s) 150 a request to take one or more samples of the first test data from/to one or more items in the bill of materials for the communication and send the one or more samples to the network monitor 140. The network monitor 140 determines 303 if a comparison of the bills of materials (the bill of materials for the communication and the bill of materials for the first test communication) will be used. If a comparison of the bills of materials in step 303 is used, the network monitor 140 initiates 304 the establishment of the first test communication. The network monitor 140 gets 305 a bill of materials for the first test communication. The network monitor 140 compares 306 the bill of materials for the communication to the bill of materials for the first test communication to determine common and/or non-common items between the two bills of materials. For example, if the communication experienced problems and the first test communication did not have any problems, then a potential diagnosis may be that the problem is in a non-common item in the bill of materials for the communication. The network monitor 140 initiates 307 the sending of the first test data in the first test communication. An example way of doing this is where a user of one of the plurality of communication devices 101 is asked whether to allow the first test communication from the one of the communication devices 101; this can be done in various ways such as from a Graphical User Interface (GUI), and/or an Interactive Voice Response System (IVR). A request is sent from the communication device 101 to the network monitor 140 to initiate the establishment of the first test communication and the network monitor 140 initiates the establishment of the first test communication. The network monitor 140 analyzes 308 the sent first test data in relation to the sent samples of the first test data (received from the network analyzer(s) 150; see step 302) and the compared bills of materials. The process goes to step 313.

If network monitor 140 in step 303 does not use the comparison of bills of materials, the network monitor 140 instructs 309 item(s) in the bill of materials for the communication to use the same communication path for the first test communication as is used for the communication. This can be done by the network monitor 140 directly communicating with the items in the bill of materials for the communication. Another way would be for the network monitor 140 to communicate the setting up of the communication path for the first test communication with a central system (not shown) for the network 100, which would then set up the first test communication's path on behalf of monitor 140. The network monitor 140 initiates 310 the establishment of the first test communication using the same bill of materials as for the communication between the plurality of communication devices 101. The network monitor 140 initiates 311 the sending of first test data in the first test communication. The network monitor 140 analyzes 312 the sent first test data (received from the network analyzer(s) 150; see step 302) in relation to sent samples of the first test data.

The network monitor 140 identifies 313 potential faults in item(s) in the bill of materials for the communication. The network monitor 140 displays 314 the potential fault item(s) in the bill of materials for the communication 200, items 120B and 120D. The network monitor can display the potential fault items in the bill of materials for the communication in a display on the network monitor, in a display on a communication device 101, and the like.

Figure 4:
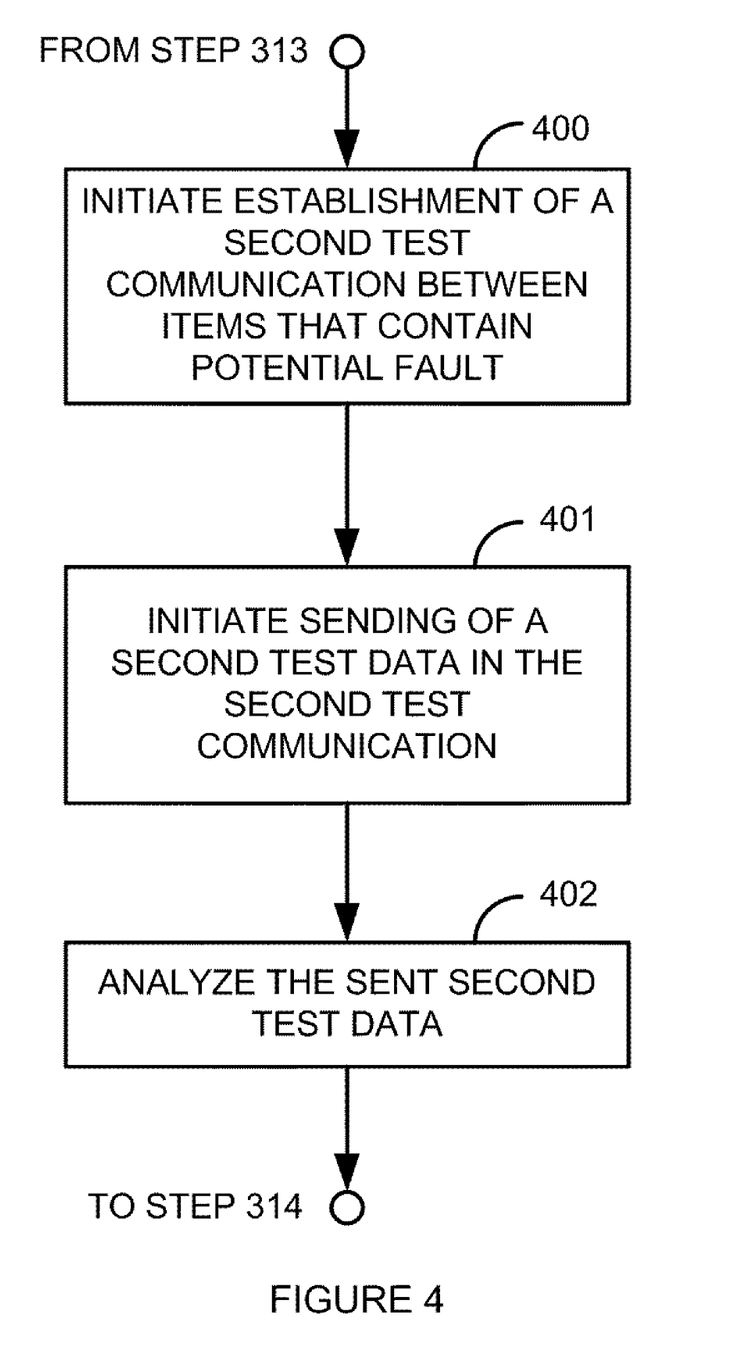
FIG. 4 is a flow diagram of a method to further identify potential faults in a bill of materials of a communication by establishing a second test communication.

FIG. 4 is a flow diagram of a method to further identify potential faults in a bill of materials for a communication by establishing a second test communication. After identifying 313 a potential fault in a plurality of items in the bill of materials for the communication, the network monitor 140 initiates 400 the establishment of a second test communication between the items in the bill of materials for the communication that contain the potential fault. The network monitor 140 initiates 401 the sending of second test data in the second test communication. The second test data can be the same test data as the first test data or the second test data can be different from the first test data. The network monitor 140 then analyzes 402 the second sent test data to further determine a more specific number of potential fault items. The process then goes to step 311.

An example of the method of FIG. 4 follows. Network monitor 140 has identified 313 router 120B, router 120D, and the link 160 between router 120B and router 120D as items in the bill of materials for the communication that may have a potential fault, from the analysis of the first test communication. The network monitor 140 initiates 400 the establishment of a second test communication between router 120B and router 120D by instructing test device 170A to establish a communication similar to the first test communication to test device 170B (e.g. a voice communication). In this example, the test devices 170A and 170B are shown in FIG. 4 external to routers 120 B and 120D. However, the test devices 170A and 170B could be embedded into routers 120B and 120D.

The communication between test devices 170A and 170B establishes a second test communication between router 120B and router 120D. The network monitor 140 initiates 401 the sending of second test data in the second test communication. The second test data sent between test devices 170A and 170B is monitored by the network analyzers 150 in routers 120B and 120D. The network monitor 140 analyzes 402 the sent second test data and the data gathered by the network analyzers 150 to further identify potential faults in router 120B, router 120D, and link 160 between router 120B and router 120D. The updated bill of materials for the communication showing the potential faults is displayed 314.

Figure 5:
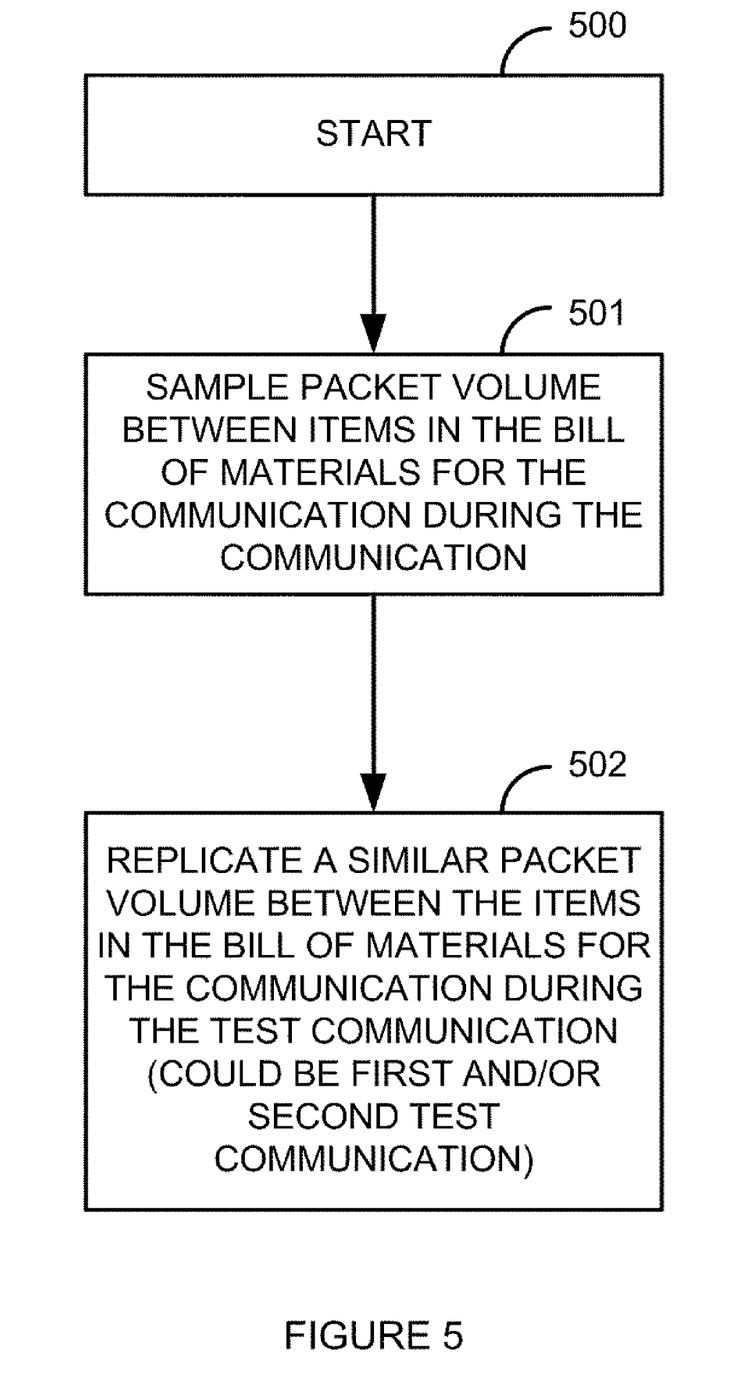
FIG. 5 is a flow diagram of a method of sampling packet volume during a communication in order to replicate a similar packet volume during a test communication.

FIG. 5 is a flow diagram of a method for sampling packet volume during a communication in order to replicate a similar packet volume during a test communication. The process starts 500. The network analyzers 150 sample 501 packet volumes between items in the bill of materials for the communication during the communication. Later, when the first test communication or subsequent test communications are established, the network analyzers 150 replicate 502 a similar packet volume between the items in the bill of materials for the test communication. This allows testing of the first test communication at a different time while still maintaining similar test conditions.

Figure 6:
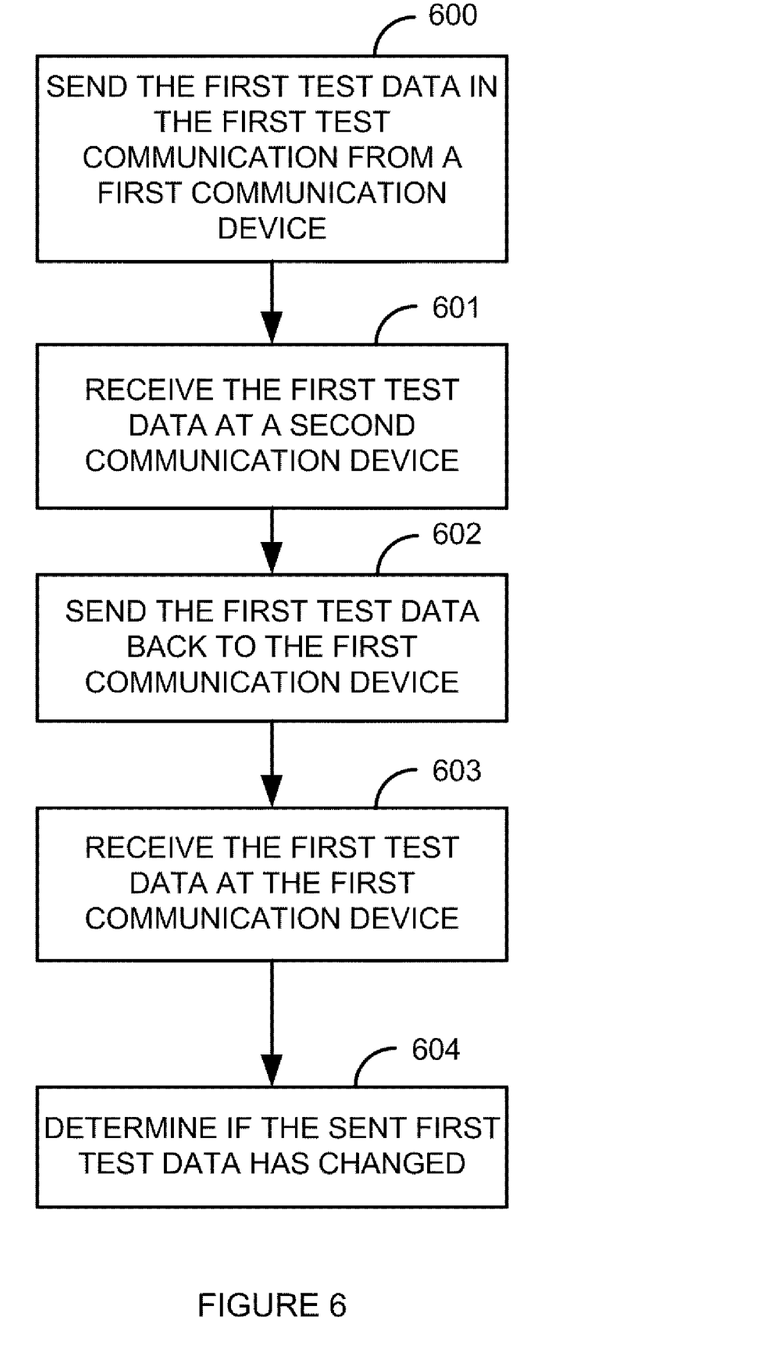
FIG. 6 is a flow diagram of a method for sending test data between communication devices in a test communication.

FIG. 6 is a flow diagram of a method for sending test data between communication devices 101 in a test communication. The following illustrative example of the method of FIG. 6 is based a communication between communication devices 101A and 101D. The process begins by a first communication device 101A sending 600 the first test data in the first test communication. The first test data is received 601 at a second communication device 101D. The second communication device 101D sends 602 the first test data back to the first communication device 101A. The first communication device 101A receives 603 the first test data. The first communication device 101A and/or the network monitor 140 determines 604 if the sent test data (from step 600) has changed during its trip to device 101D and back.

Of course, various changes and modifications to the illustrative embodiment described above will be apparent to those skilled in the art. For example, a bill of materials may change over this. Detecting these changes can be useful in detecting new problems within a network. This could be initiated by DTMF signaling. Other examples could be where a media stream fails to be completely established due to a misconfiguration in the network. This will help in diagnosing where in the network a failure is. This system could also identify problems with different devices in different regions or countries and differences that cause communication problems. These changes and modifications can be made without departing from the spirit and the scope of the system and method and without diminishing its attendant advantages. It is therefore intended that such changes and modifications be covered by the following claims except insofar as limited by the prior art.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

What is claimed is:

1. A system comprising:
    a network monitor configured to:
        get a bill of materials for a communication of communication data between a plurality of communication devices across a network, wherein the bill of materials for the communication comprises a plurality of items and wherein the communication may be established using different communication paths within the network depending on a condition in the network;
        receive a request to generate a first test communication between the plurality of communication devices;
        send to a network analyzer a request to take one or more samples of first test data in the first test communication from one or more items in the bill of materials for the communication and send the one or more samples to the network monitor;
        initiate establishment of the first test communication;
        get a bill of materials for the first test communication;
        compare the bill of materials for the communication to the bill of materials for the first test communication;
        initiate sending of the first test data in the first test communication;
        receive one or more monitored samples of the first test data; and
        analyze the sent first test data in the first test communication in relation to one or more sent samples of the first test data and the compared bills of materials;
    the network analyzer configured to:
        sample a volume of packets between the plurality of items in the bill of materials for the communication on the network during the communication; and
        replicate a similar volume of packets between the plurality of items in the bill of materials for the communication during the first test communication.

2. The system of claim 1, wherein the network monitor is further configured to identify a potential fault in one or more items in the bill of materials for the communication and display the potential fault in the one or more items in a display of the bill of materials for the communication.

3. The system of claim 2, wherein the potential fault is in a plurality of items in the bill of materials for the communication and the network monitor is further configured to initiate establishment of a second test communication between at least two items in the bill of materials for the communication that contain the potential fault, initiate the sending of second test data in the second test communication, and analyze the second test data sent in the second test communication.

4. The system of claim 1, wherein the bill of materials for the communication is at least one of a media path bill of materials or a signaling path bill of materials.

5. The system of claim 1, wherein a user of one of the plurality of communication devices initiates the request to generate the first test communication.

6. The system of claim 5, wherein the user is asked whether to allow the communication between the plurality of communication devices from the one of the communication devices with at least one of the following: a Graphical User Interface (GUI) or an Interactive Voice Response System (IVR).

7. The system of claim 1, wherein the first test data is based on samples of the payload of at least one media packet in the communication.

8. The system of claim 7, wherein the at least one media packet is at least one item selected from the group comprising: voice packet and a video packet.

9. The system of claim 1, further comprising:
    a first communication device of the plurality of communication devices configured to send the first test data in the first test communication, and receive the first test data back from a second communication device of the plurality of communication devices;
    the second communication device configured to receive the first test data sent from the first communication device and send the first test data back to the first communication device; and
    at least one of the network monitor or the first communication device further configured to determine if the first test data has changed during its trip from the first communication device to the second communication device and back.

10. The system of claim 1, wherein the first test data is one of the following: a voice data, a video data, or an application data.

11. The system of claim 1, wherein the first test data contains at least part of the communication data.

12. A method comprising:
getting a bill of materials for a communication of communication data between a plurality of communication devices across a network at a network monitor, wherein the bill of materials for the communication comprises a plurality of items and wherein the communication may be established using different communication paths within the network depending on a condition in the network;
receiving a request at the network monitor to generate a first test communication between the plurality of communication devices;
sending a request from the network monitor to a network analyzer to take one or more samples of first test data in the first test communication from one or more items in the bill of materials for the communication and send the one or more samples to the network monitor;
initiating in the network monitor the establishment of the first test communication;
getting in the network monitor a bill of materials for the first test communication;
comparing in the network monitor the bill of materials for the communication to the bill of materials for the first test communication;
initiating in the network monitor the sending of the first test data in the first test communication;
receiving from the network analyzer the one or more samples of the first test data;
analyzing in the network monitor the sent first test data in the first test communication in relation to the one or more sent samples of the first test data and the compared bills of materials;
sending the first test data in the first test communication from a first communication device of the plurality of communication devices;
receiving the first test data at a second communication device of the plurality of communication devices;
sending from the second communication device the first test data back to the first communication device;
receiving the first test data at the first communication device; and
determining if the first test data has changed in the first communication device during its trip from the first communication device to the second communication device and back.

13. The method of claim 12, wherein the step of analyzing the sent first test data further comprises the steps of: identifying in the network monitor a potential fault in one or more items in the bill of materials for the communication and displaying in the network monitor the potential fault in the one or more items in a display of the bill of materials for the communication.

14. The method of claim 13, wherein the potential fault is in a plurality of items in the bill of materials for the communication and further comprising the steps of:
initiating in the network monitor the establishment of a second test communication between at least two items in the bill of materials for the communication that contain the potential fault;
initiating in the network monitor the sending of a second test data in the second test communication; and
analyzing in the network monitor the sent second test data sent in the second test communication.

15. The method of claim 12, wherein the bill of materials for the communication is at least one of a media path bill of materials or a signaling path bill of materials.

16. The method of claim 12, wherein a user of one of the plurality of communication devices initiates the request to generate the first test communication.

17. The method of claim 16, wherein the user is asked whether to allow the communication between the plurality of communication devices from the one of the communication devices with at least one of the following: a Graphical User Interface (GUI) or an Interactive Voice Response System (IVR).

18. The method of claim 12, further comprising the step of: generating in the network monitor or one of the plurality of communication devices the first test data based on samples of the payload of at least one media packet in the communication.

19. The method of claim 18, wherein the at least one media packet is at least one item selected from the group comprising: a voice and a video packet.

20. The method of claim 12, further comprising the steps of:
sampling in a network analyzer a volume of packets between the plurality of items in the bill of materials for the communication on the network during the communication; and
replicating in the network analyzer a similar volume of packets between the plurality of items in the bill of materials for the communication during the first test communication.

21. The method of claim 12, wherein the first test data is one of the following: a voice data, a video data, or an application data.

22. The method of claim 12, wherein the first test data contains at least part of the communication data.

* * * * *